US008432367B2

(12) United States Patent
Li et al.

(10) Patent No.: US 8,432,367 B2
(45) Date of Patent: Apr. 30, 2013

(54) TRANSLATING USER INTERACTION WITH A TOUCH SCREEN INTO INPUT COMMANDS

(75) Inventors: Yang Li, Sunnyvale, CA (US); Michael A. Cleron, Menlo Park, CA (US); Dianne K. Hackborn, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 569 days.

(21) Appl. No.: 12/621,759

(22) Filed: Nov. 19, 2009

(65) Prior Publication Data

US 2011/0115721 A1    May 19, 2011

(51) Int. Cl.
   *G06F 3/041*    (2006.01)
(52) U.S. Cl.
   USPC .......................................................... 345/173
(58) Field of Classification Search ........... 345/173–176
   See application file for complete search history.

(56) References Cited

U.S. PATENT DOCUMENTS

| | | | |
|---|---|---|---|
| 4,988,981 A | | 1/1991 | Zimmerman et al. |
| 5,252,951 A | | 10/1993 | Tannenbaum et al. |
| 5,379,057 A | | 1/1995 | Clouqh et al. |
| 5,488,204 A | | 1/1996 | Mead et al. |
| 5,596,346 A | * | 1/1997 | Leone et al. ................ 345/667 |
| 5,675,362 A | | 10/1997 | Clough et al. |
| 5,864,635 A | | 1/1999 | Zetts et al. |
| 5,880,411 A | | 3/1999 | Gillespie et al. |
| 5,953,735 A | * | 9/1999 | Forcier .......................... 715/273 |
| 6,057,845 A | * | 5/2000 | Dupouy ........................ 715/863 |
| 6,188,391 B1 | | 2/2001 | Seely et al. |
| 6,323,846 B1 | | 11/2001 | Westerman et al. |
| 6,573,883 B1 | | 6/2003 | Bartlett |
| 6,594,616 B2 | | 7/2003 | Zhang et al. |

(Continued)

FOREIGN PATENT DOCUMENTS

| | | |
|---|---|---|
| EP | 689124 | 12/1995 |
| JP | 7-146750 A | 6/1995 |

(Continued)

OTHER PUBLICATIONS

International Search Report and Written Opinion issued in PCT/US2010/056400 dated May 30, 2011.

(Continued)

*Primary Examiner* — Joseph Haley
*Assistant Examiner* — Nicholas Lee
(74) *Attorney, Agent, or Firm* — Fish & Richardson P.C.

(57) ABSTRACT

Systems and techniques for translating user interaction with a touch screen into input commands. In one aspect, a touch screen system includes a touch screen graphical display, a command interpreter configured to identify modifier interactions with the graphical display and, in response to identification of the modifier interaction, modify the interpretation of other interaction with the graphical display, one or more persistent data storage devices. The data storage devices store a first set of rules for interpreting user interaction with the graphical display and a second set of rules for interpreting user interaction with the graphical display. The first set of rules interpret motion across a map or a proper subset of a collection of information as a scrolling or panning command. The second set of rules interpret the motion as a glyph. The command interpreter is configured to modify the interpretation of the other interaction by switching between interpretation under the first set of rules and interpretation under the second set of rules.

24 Claims, 9 Drawing Sheets

U.S. PATENT DOCUMENTS

| | | | |
|---|---|---|---|
| 2003/0222917 | A1 | 12/2003 | Trantow |
| 2004/0193413 | A1 | 9/2004 | Wilson et al. |
| 2006/0026521 | A1 | 2/2006 | Hotelling et al. |
| 2006/0026536 | A1* | 2/2006 | Hotelling et al. ............. 715/863 |
| 2006/0097991 | A1 | 5/2006 | Hotelling et al. |
| 2006/0101354 | A1 | 5/2006 | Hashimoto et al. |
| 2006/0103633 | A1 | 5/2006 | Gioeli |
| 2006/0125803 | A1 | 6/2006 | Westerman et al. |
| 2006/0197753 | A1 | 9/2006 | Hotelling |
| 2006/0209014 | A1 | 9/2006 | Duncan et al. |
| 2007/0177803 | A1 | 8/2007 | Elias et al. |
| 2007/0177804 | A1 | 8/2007 | Elias et al. |
| 2007/0184878 | A1 | 8/2007 | Lee |
| 2007/0273674 | A1 | 11/2007 | Cohen et al. |
| 2008/0137971 | A1 | 6/2008 | King et al. |
| 2008/0163130 | A1 | 7/2008 | Westerman |
| 2009/0040215 | A1 | 2/2009 | Afzulpurkar et al. |
| 2009/0061947 | A1 | 3/2009 | Park et al. |
| 2009/0091540 | A1* | 4/2009 | Doan et al. ................. 345/173 |
| 2009/0210810 | A1* | 8/2009 | Ryu et al. .................... 715/769 |
| 2009/0278806 | A1* | 11/2009 | Duarte et al. ................ 345/173 |

FOREIGN PATENT DOCUMENTS

| | | |
|---|---|---|
| JP | 2002-259046 | 9/2002 |
| JP | 2005-293061 | 10/2005 |
| WO | WO2006/094308 | 9/2006 |
| WO | WO2008/085783 | 7/2008 |
| WO | WO2008/085784 | 7/2008 |

OTHER PUBLICATIONS

"Hand Tracking Finger Identification, and Chordic Manipulation on a multi-touch surface," by Wayne Westerman, University of Delaware, Spring 1999, p. 1-333.

"Learn All the Apple IPhone Gestures Here—Look," by Ivan Stefek,. Aug. 9, 2008 EzineArticles.com. Retrieved Jan. 21, 2010. Available at http://ezinearticles.com/?Learn—All—the—Apple—IPhone—Gestures—Here—Look&id=1397293.

SENSIVA, Inc., "Symbol Commander," Nov. 2004, Retrieved from the Internet: http://web.archive.org/web/20041106050200/www.sensiva.com/symbolcommander/index.html, [retrieved on Mar. 30, 2010], (2 pages).

Appert, Caroline and Zhai, Shumin, "Using Strokes as Command Shortcuts: Cognitive Benefits and Toolkit Support," CHI 2009, Apr. 4-9, 2009, Boston, Massachusetts, Copyright 2009, ACM 978-1-60558-246-07/09/04, 10 pages.

Eaton, Kit, Fast Company, "Samsung Shows One Future for Touchscreen Cellphones: Alphabet Gestures," [retrieved on Apr. 10, 2009], Retrieved from the Internet: >URL: http://www.fastcompany.com/blog/kit-eaton/technomix/samsung-shows-one-future-touchscreen-cellphones-alphabet-gestures>, 2 pages.

Geissler, Jorg, "Gedrics: The Next Generation of Icons," German National Research Center for Computer Science (GMD), Integrated Publication and Information Systems Institute (IPSI), Proceedings of the 5th Internation Conference on Human—Computer Interaction (INTERACT '95), Lillehammer, Norway, Jun. 27-29, 1995, pp. 73-78.

Gross, Mark D. and Yi-Luen Do, Ellen, "Drawing on the Back of an Envelope: A Framework for Interacting with Application Programs by Freehand Drawing," Design Machine Group, Arch. Dept., University of Washington, Seattle, WA, 39 pages.

Monson-Haefel, Richard, "Multitouch++: One Finger Gestures," Feb. 2, 2009 [retrieved Apr. 10, 2009], Retrieved from the Internet: <URL:http://theclevermonkey.blogspot.com/2009/02/one-finger-gestures.html>, 4 pages.

Wobbrock, Jacob O., Morris, Meredith Ringel, and Wilson, Andrew D., "User-Defined Gestures for Surface Computing," CHI 2009, Apr. 4-9, 2009, Boston, Massachusetts, Copyright 2009, ACM 978-1-60558-246-7/09/04, 10 pages.

Wolin, A., Eoff, B., and Hammond, T. , "Search Your Mobile Sketch: Improving the Ratio of Interaction to Information on Mobile Devices," 2009 Intelligent User Interfaces (IUI 2009) Workshop on Sketch Recognition, Short Talks, Sanibel Island, Florida, Feb. 8-11, 2009, 5 pages.

International Preliminary Report on Patentability; Becamel, Philippe; May 22, 2012; World Intellectual Property Organization (WIPO) (International Bureau of); PCT/US2010/056400; 8 pages.

\* cited by examiner

TRANSLATING USER INTERACTION WITH A TOUCH SCREEN INTO INPUT COMMANDS

BACKGROUND

This specification relates to translating user interaction with a touch screen into input commands.

People spends hours at a time with their electronic devices—computers, telephones, music players, PDA's, and the like. They like best those devices that are intuitive to use and whose interactions best meet their expectations regarding how machines should work. They interact with electronics through inputs and outputs from the devices, where the outputs generally are provided audibly and/or on a graphical display screen, and the inputs may occur via touch screens, joysticks, mice, 4-directional keypads, and other such input mechanisms.

Touch screens are graphical display devices that act as both inputs and outputs. In particular, touch screens include a graphical display and detect the presence and location of manual interaction with that graphical display. A user can thus interact with the elements shown on the graphical display intuitively, in ways that resemble the ways that humans interact with the world outside of graphical displays and electronic devices.

SUMMARY

Although dramatic advances have been made in touch screen technology, the variety of commands that could potentially be input into a touch screen is much larger than the commands that can be distinguished by touch screens using present techniques. For example, an electronic device may be able to receive input that commands some portion of the displayed elements be scrolled or panned. Scrolling is the movement of elements shown on a display screen, generally either in either a horizontal or vertical direction. For example, a list of contacts can be scrolled from top to bottom on the display screen of a cell phone so that some contacts appear to move off of the bottom display screen as other contacts appear to move onto the top of the display screen. Panning is the movement of the portion of a map shown in on a display screen. Panning does not change the arrangement of features shown on the map but rather moves the user's field of view across what appears to be a larger image of the map.

In many touch screens, a user commands the graphical display to scroll or pan by dragging a finger across the display. In response, the graphical display will scroll or pan in the same direction. Although such interaction is intuitively easy for people to understand, a touch screen that interprets all finger dragging as a scroll or pan command is unable to correctly interpret other commands that may resemble scroll or pan commands.

Accordingly, systems and techniques that allow touch screen systems to translate user interaction into a relatively larger array of input commands are described. In one aspect, a method includes a touch screen system identifying stationary contact with a touch screen graphical display, the touch screen system starting a timer in response to the identification of the stationary contact, the touch screen system determining whether a second user interaction with the touch screen graphical display is timely using the timer, and in response to the second user interaction being timely, the touch screen system interpreting the second user interaction as a glyph.

This and other aspects can include one or more of the following features. The touch screen system can interpret the stationary contact as a zoom-in command in response to the second user interaction being untimely. The method can also include, in response to the second user interaction being untimely, the touch screen system interpreting the stationary contact as a command directing that that further details regarding an entry contacted by the stationary contact. Interpreting the second user interaction as a glyph can include interpreting the second user interaction under a set of rules tailored to the identification of alphanumeric characters.

Identifying the stationary contact can include determining that the stationary contact is in contact with an edge of the touch screen graphical display. Interpreting the second user interaction as a glyph can include disabling of finger dragging interactions as scrolling or panning commands. The method can also include the touch screen system pinning the touch screen graphical display in response to identification of the stationary contact. The method can also include the touch screen system changing to a new translation mode in response to the second user interaction being timely. The new translation mode can include a glyph translation mode tailored to interpret user interaction involving multiple finger drags across the touch screen graphical display as glyphs.

In another aspect, a touch screen system includes a touch screen graphical display, a command interpreter configured to identify modifier interactions with the graphical display and, in response to identification of the modifier interaction, modify the interpretation of other interaction with the graphical display, one or more persistent data storage devices. The data storage devices store a first set of rules for interpreting user interaction with the graphical display and a second set of rules for interpreting user interaction with the graphical display. The first set of rules interpret motion across a map or a proper subset of a collection of information as a scrolling or panning command. The second set of rules interpret the motion as a glyph. The command interpreter is configured to modify the interpretation of the other interaction by switching between interpretation under the first set of rules and interpretation under the second set of rules.

This and other aspects can include one or more of the following features. The touch screen system can include a collection of map information stored at the one or more persistent data storage devices. The touch screen system can also include a hand-held housing mounting the touch screen graphical display. The command interpreter can be configured to identify contact on a lateral side of the touch screen graphical display as modifier interactions. The command interpreter can be configured to identify stationary contact followed by a timely second contact as modifier interactions. The second set of rules can include rules for interpreting the motion as a custom glyph. The command interpreter can be configured to identify a pinning command, the pinning command disabling a touch screen system from interpreting finger dragging as a scroll command or as a pan command. The touch screen system can also include a clock. The command interpreter can be configured to start a timer that relies on the clock in response to identification of a stationary contact with the graphical display.

The command interpreter can be configured to identify a modifier interaction in response to a second user interaction being received before the timer reaches a threshold period. The threshold period can be within 15% of one second. The command interpreter can be configured to interpret the stationary contact as a zoom-in command in response to a failure to receive a second user interaction before the timer reaches a threshold period. The command interpreter can be configured to interpret the stationary contact as a command directing that that further details regarding an entry contacted by the stationary contact in response to a failure to receive a second user interaction before the timer reaches a threshold period.

In another aspect, a touch screen system includes a touch screen graphical display, means for translating a same user interaction with the touch screen graphical display into two different input commands, and one or more persistent data storage devices storing rules accessible by the means for translating.

This and other aspects can include one or more of the following features. The touch means for translating can include a clock and a timer that relies on the clock and configured to start in response to identification of a stationary contact with the touch screen graphical display.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
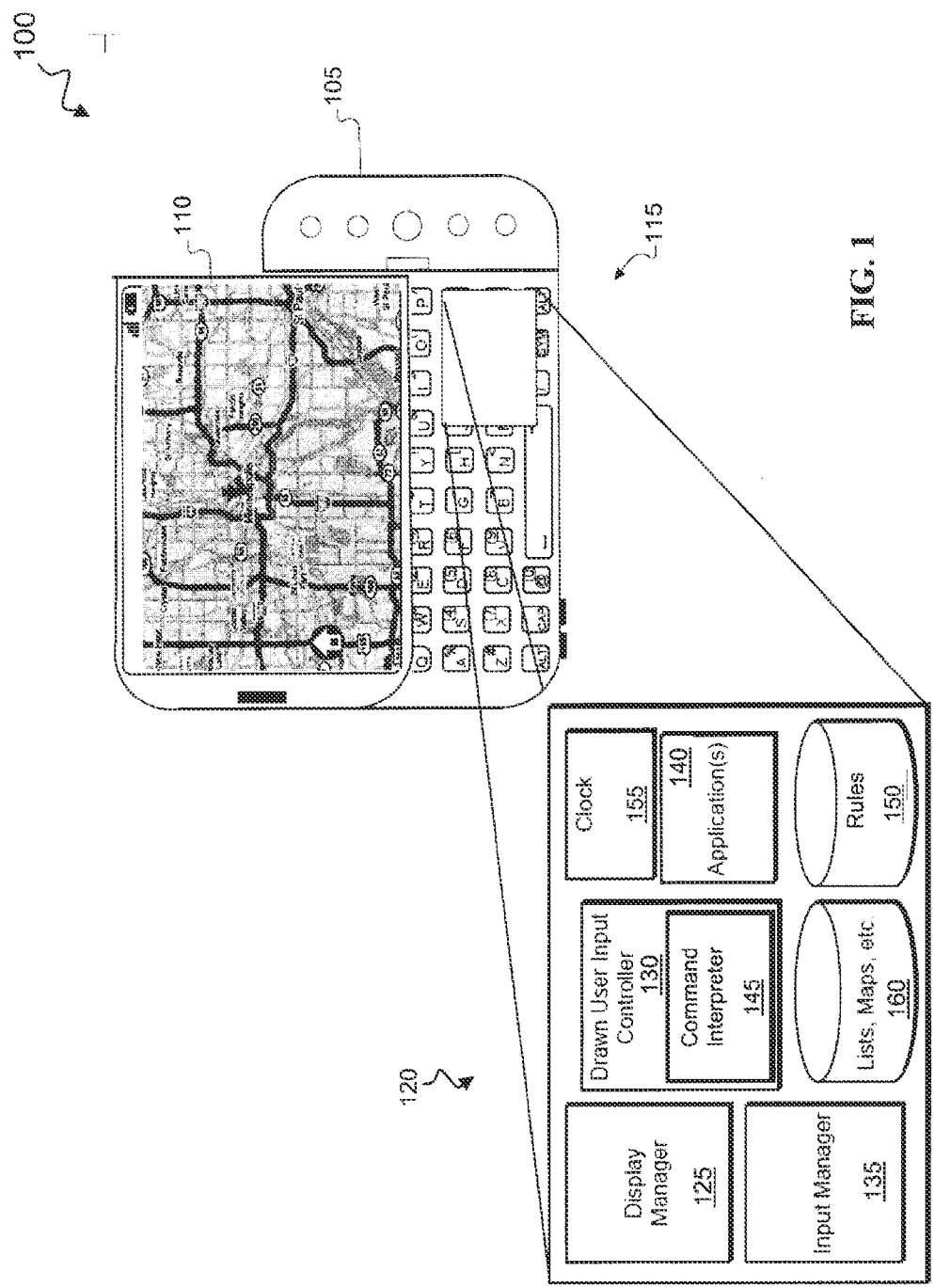
FIG. 1 is a schematic diagram of a touch screen system.

FIG. 1 is a schematic diagram of a touch screen system 100. Touch screen system 100 includes a housing 105 onto which a touch screen graphical display 110 is moveably mounted. Touch screen graphical display 110 is moveable to expose a collection of input keys 110. Housing 105 houses a collection of electronic components 120 that cooperate to provide the functionality needed to operate touch screen system 100, including the ability to distinguish different commands input over touch screen graphical display 110. Touch screen system 100 can be, e.g., a computer, a telephone, a music player, a PDA, or the like. In some implementations, touch screen system 100 can be mobile, hand-held device, as shown.

Electronic component collection 120 includes a display manager 125, a drawn user input controller 130, an input manager 135, and a clock 155. Display manager 125, drawn user input controller 130, and input manager 135 can be implemented using digital electronic circuitry, or in computer software, firmware, or hardware. Clock 155 can be an integral part of one or more of display manager 125, drawn user input controller 130, and input manager 135 or clock 155 can be a separate component, as shown.

Display manager 125 is a device that is configured to render content for presentation on touch screen graphical display 110. Display manager 125 can receive graphic-related content from a number of sources and may determine how the content is to be provided to a user. For example, different windows for various applications 140 may need to be displayed, and the display manager 125 can determine which to display, which to hide, and what to display or hide when there is overlap between various graphical objects. Display manager 125 can include various components to provide particular functionality for interacting with displayed components, which may be shared across multiple applications, and may be supplied, for example, by an operating system.

Drawn user input controller 130 is a device that is configured to translate user interaction with touch screen graphical display 110 into commands. Drawn user input controller 130 can thus distinguish between different commands input over touch screen graphical display 110. In distinguishing between different commands, drawn user input controller 130 may refer to a command interpreter 145. Command interpreter 145 implements sets of rules 150 for interpreting user interaction with touch screen graphical display 110 as commands. In some implementations, rule sets 150 can include both default and user-specific rules for translating user interaction into commands and can be stored in a data storage device.

Input manager 135 is a device that is configured to implement the commands embodied by user interaction with various input elements of touch screen system 100—including graphical display 110—using control signals that can be interpreted by other components in collection 120. For example, such commands may come from input keys 115, from touch screen graphical display 110, from a trackball, or from other such sources, including dedicated buttons or soft buttons (e.g., buttons whose functions may change over time, and whose functions may be displayed on areas of graphical display 110 that are adjacent to the particular buttons. Input manager 135 can determine, for example, in what area of the display commands are being received, and thus in what application being shown on the display the commands are intended for.

In some implementations, input manager 135 may translate input motions on graphical display 110 into a common format and pass those interpreted motions (e.g., short press, long press, flicks, and straight-line drags) to the appropriate application. Input manager 135 can also report such inputs to an event manager (not shown) that in turn reports them to the appropriate modules or applications.

In some implementations, input manager 135 can include one or more maps for implementing the interpretations of the user interaction with touch screen graphical display 110 using control signals that can be interpreted by other components in collection 120. In some implementations, different maps are specific to different applications 140. In this manner, the controller 417 can act as an intermediary between input elements and applications 140.

A variety of applications 140 may operate, generally on a common microprocessor, on touch screen system 100. The applications 140 may take a variety of forms, such as mapping applications, e-mail and other messaging applications, web browser applications, music and video players, and various applications running within a web browser or running extensions of a web browser. Applications 140 may include applications that stored records or other components having alphanumeric names.

In some implementations, electronic component collection 120 also includes a wireless interface. A wireless interface is a device configured to manage communication with a wireless network, which may be a data network that also carries voice communications. A wireless interface can provide for communication by the touch screen system 100 with messaging services such as text messaging, e-mail, and telephone voice mail messaging. In addition, the wireless interface may support downloads and uploads of content and computer code over a wireless network.

Various forms of persistent data storage may be provided in touch screen system 100, such as using fixed disk drives and/or solid state memory devices. For example, a lists, maps, etc. storage 160 can store various definitions for objects that may be stored on and presented by touch screen system 100.

Such objects include lists of other objects, such as lists of songs, television shows, movies, or other media on the device. The lists may also include lists of file names where touch screen system 100 stores a large number of files. Also, other objects such as maps may be stored (e.g., as graphical map tiles that can be pre-fetched from a remote server), and meta data about the maps, such as the names of towns and streets on a map, along with the names of points of interest and business on the maps.

In some implementations, storage 160 can also store profile information for a user. Profile information includes various parameters about a user of touch screen system 100. For example, the profile information may include data defining various custom commands that a user has entered, along with objects or actions to be associated with the entry of those commands. Profile information can be stored in a variety of forms, such as in one or more XML files or in Sqlite files.

Using the pictured components, and others that are omitted here for clarity, the touch screen system 100 may distinguish different commands input with graphical display 110.

Figure 2:
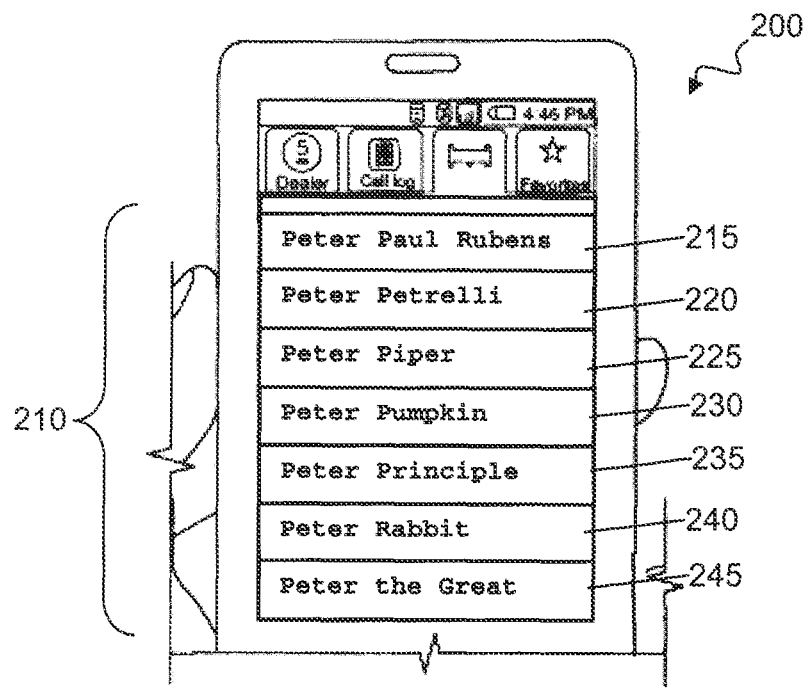
FIGS. 2-9 are schematic representations of user interaction with touch screen systems.
Figure 3:
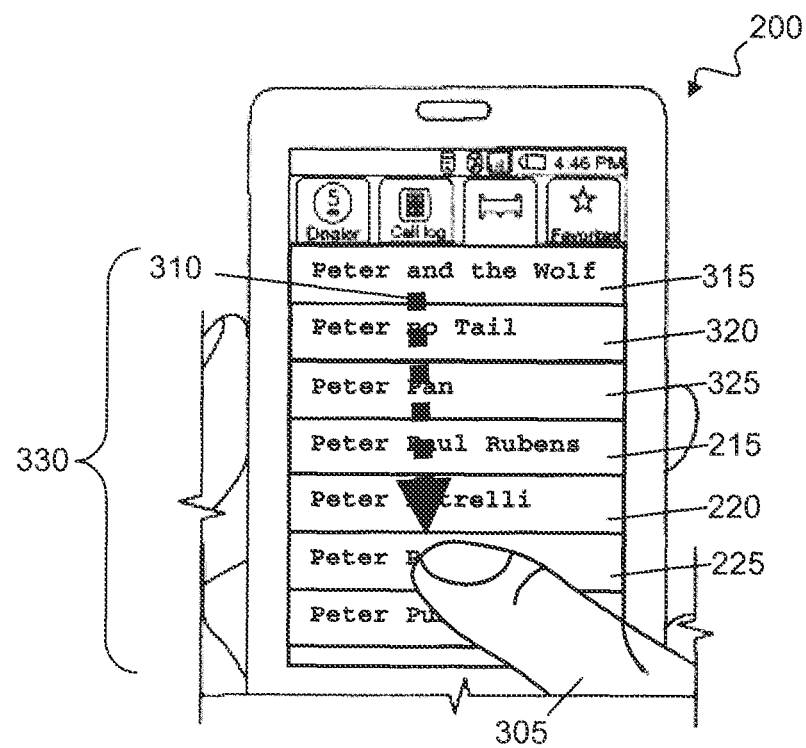
Figure 4:
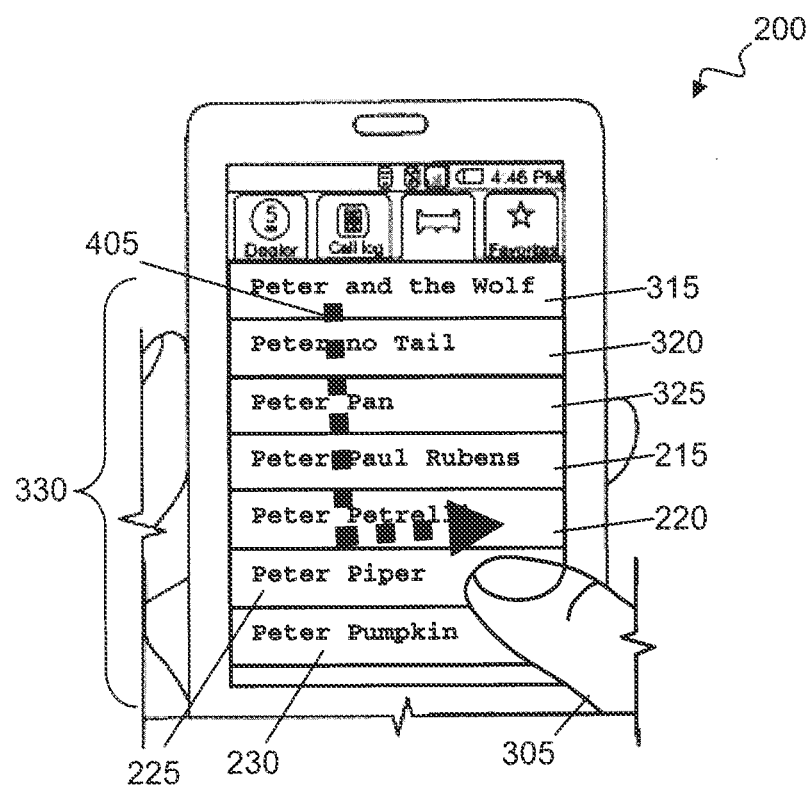

FIGS. 2-4 are schematic representations of user interaction with a touch screen system such as touch screen system 100 (FIG. 1). In FIG. 2, the touch screen system includes a touch screen graphical display 200 that displays a proper subset 210 of a collection of information for a user to see. In particular, a collection of entries 215, 220, 225, 230, 235, 240, 245 are displayed an ordered, vertical list that spans a window in graphical display 200. Each entry 215, 220, 225, 230, 235, 240, 245 identifies a separate entity. The identified entities can be, e.g., contacts in an electronic address or phone book, songs or movies in an electronic media collection, e-mails in a mailbox, or the like.

The touch screen system will interpret user interaction with graphical display 200 according to a set of rules. Typically, these rules are tailored to allow a user to navigate through the collection of information. Referring to FIG. 3, the touch screen system translates the dragging of a finger 305 in a generally downward direction across graphical display 200 into a scroll down command. This movement of finger 305 is represented by an arrow 310 which, in general, is not actually displayed on graphical display 200. In response to the scroll down command, entries 235, 240, 245 appear to move off the bottom of the window in graphical display 200, whereas new entries 315, 320, 325 appear to enter the top of the window in graphical display 200. Thus, a different proper subset 330 of the collection of identification information is displayed for a user to see.

This response to the dragging of finger 305 is effective for scrolling through a collection of information and intuitively easy for users to understand. However, always translating the dragging of finger 305 in this manner limits the variety of commands that could potentially be input via graphical display 200. FIG. 4 illustrates an example situation in which translating the dragging of finger 305 in this manner limits the variety of commands that can be input. In particular, a user is dragging finger 305 across graphical display 200 in a generally L-shaped pattern. This movement of finger 305 is represented by an L-shaped arrow 405 which, in general, is not actually displayed on graphical display 200:

The touch screen system may interpret this L-shaped pattern as including a scroll down command. In particular, the downward stroke of the finger in the first part of the L-shaped pattern can be mistaken for a downward scroll command. The sideways stroke of the finger in the second part of the L-shaped pattern can be ignored or taken as a command that is independent of the downward scroll command. Thus, the touch screen system may not be able to distinguish between a downward scroll command and a second command embodied by an L-shaped pattern. This limits the number of commands that can be input over graphical display 200.

Figure 5:
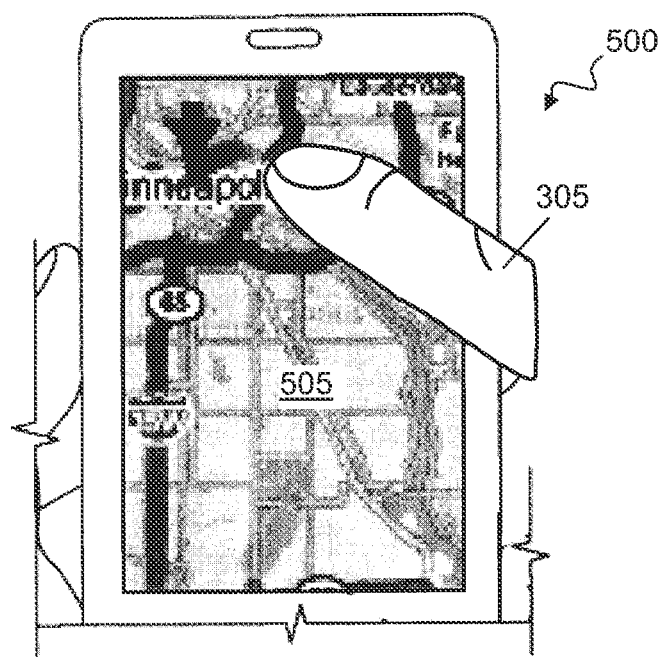
Figure 6:
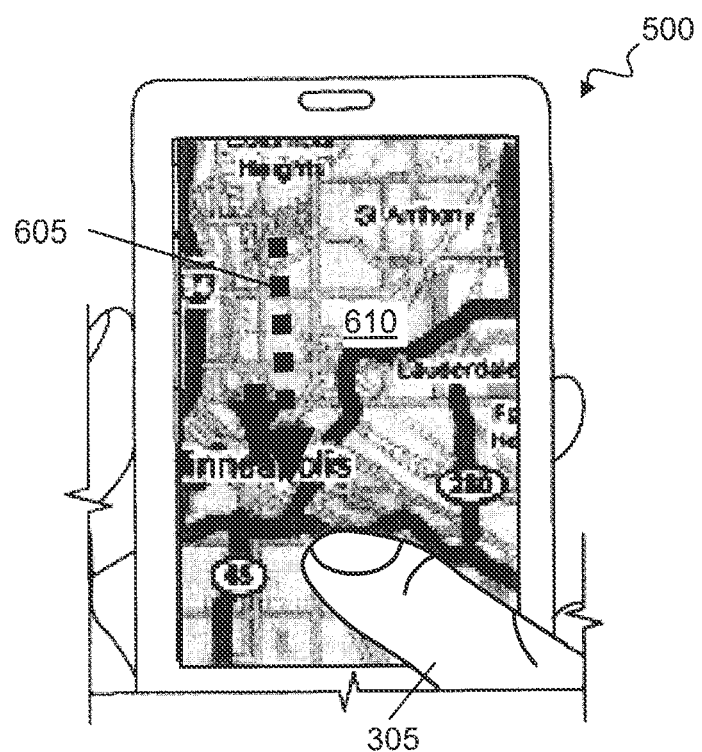
Figure 7:
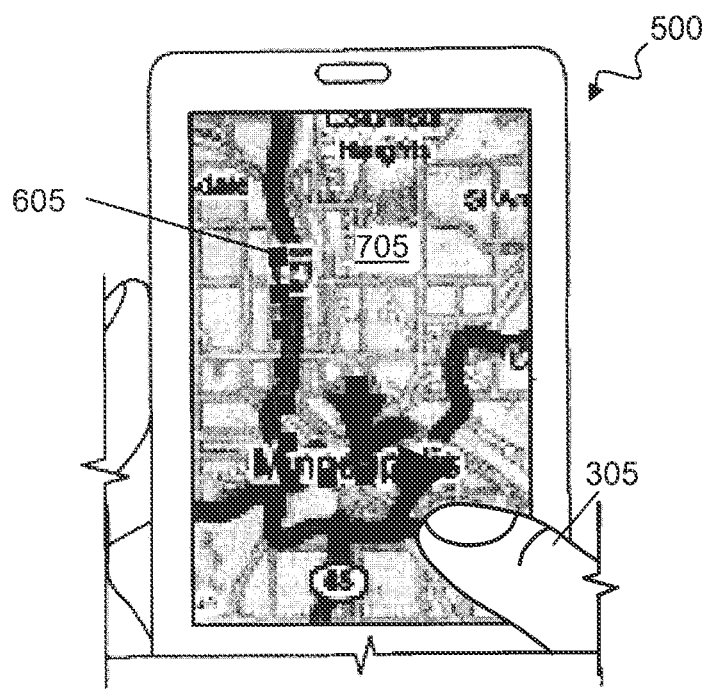

Such difficulties are also apparent during user interaction with touch screen graphical displays that display maps. FIGS. 5-7 are schematic representations of user interaction with a touch screen system such as touch screen system 100 (FIG. 1). In FIG. 5, the touch screen system includes a touch screen graphical display 500 that displays a section 505 of a map. In section 505, an arrow indicium identifies the city Minneapolis in the top left corner of graphical display 500. The touch screen system will translate user interaction with graphical display 200 into input commands according to a set of rules. Typically, these rules are tailored to allow a user to change the map display. Referring to FIG. 6, the touch screen system interprets the dragging of a finger 305 in a generally downward direction across graphical display 500 as a pan down command. This movement of finger 305 is represented by an arrow 605 which, in general, is not actually displayed on graphical display 500. In response to the pan down command, the bottom portion of the map appear to move off the bottom of the window in graphical display 500, whereas a new portion of the map appears to enter the top of the window in graphical display 500. The arrow indicium identifying the city Minneapolis moves downward and a different section 610 of the map is displayed for a user to see.

Referring to FIG. 7, the touch screen system further interprets the dragging of a finger 305 sideways across graphical display 500 as a pan sideways command. This movement of finger 305 is represented by the lower, sideways-directed portion of arrow 605. In response to the pan sideways command, the rightmost portion of the map appear to move off the right of the window in graphical display 500, whereas a new portion of the map appears to enter the left of the window in graphical display 500. The arrow indicium identifying the city Minneapolis moves rightward on graphical display 500 and a different section 705 of the map is displayed for a user to see.

Although it may sometimes be appropriate to interpret this L-shaped pattern as a pair of panning commands, such an interpretation limits the number of commands that can be input over graphical display 200.

Figure 8:
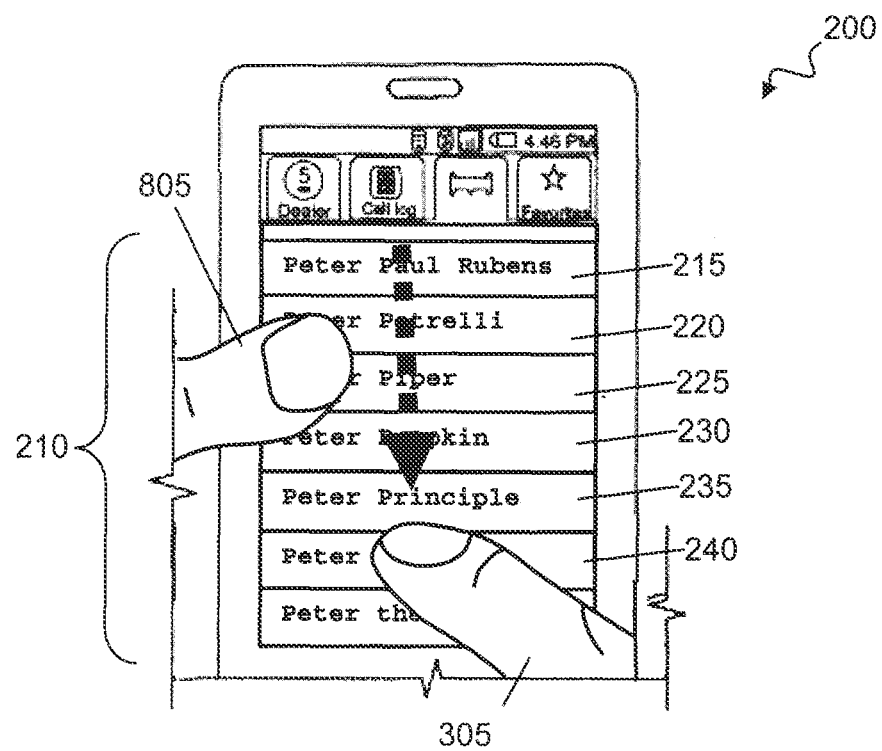

FIG. 8 is a schematic representations of user interaction with a touch screen system such as touch screen system 100 (FIG. 1) in which additional number of commands can be input over a graphical display. In particular, the user has placed a thumb 805 on the lateral side of graphical display 200 while dragging finger 305 in a generally downward direction across graphical display 200. The touch screen system does not interpret this dragging of finger 305 as a scroll down command. Instead, the touch screen system translates the combination of the placement of thumb 805 and the dragging of finger 305 into a new command altogether, e.g., as the input of a glyph command.

Figure 9:
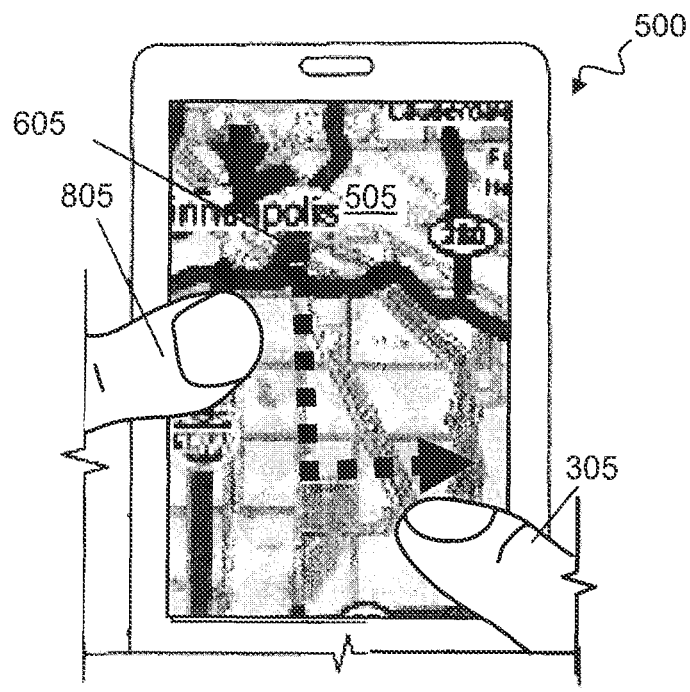

FIG. 9 is a schematic representations of user interaction with a touch screen system such as touch screen system 100 (FIG. 1) in which additional number of commands can be input over a graphical display. In particular, the user ha's placed a thumb 805 on the lateral side of graphical display 500 while dragging finger 305 in a generally L-shaped pattern across graphical display 500. With this combination, the touch screen system does not interpret this movement of finger 305 as a pair of panning commands. Instead, the touch screen system translates the combination of the placement of thumb 805 and the dragging of finger 305 into a new command altogether, e.g., as the input of a glyph command.

The placement of thumb 805 on the lateral side of graphical displays 200, 500 is a "pinning" input that pins graphical displays 200, 500 and prevents the touch screen system from interpreting other user interaction as either a scrolling or a panning command. The pinning input by thumb 805 thus modifies the translation of the movement of finger 305. For example, in the absence of thumb 805 on graphical displays 200, 500, these touch screen system can interpret the movement of finger 305 in accordance with a first set of rules 150 (FIG. 1). With thumb 805 on graphical displays 200, 500, these touch screen system can interpret the movement of finger 305 in accordance with a second set of rules 150 (FIG. 1). In some implementations, the representation on graphical display 500 can be completely immobile while pinned.

In some implementations, the touch screen systems are configured to interpret the movements of finger 305 while pinned by thumb 805 as "glyphs." A glyph is a visual writing element that a user can enter, such as by dragging their finger on a touchscreen, generally in a single traced motion without lifting their finger. Glyphs can include alphanumeric characters and other symbols.

Glyphs can be construed by a touch screen system in a number of different ways. For example, a glyph can be construed as a command to display a proper subset of a collection of information that start or are otherwise associated with a glyph. By way of example, a user who is looking at a long list of items such as a list of songs in a playlist, may draw a letter of the alphabet on the display. In response, a touch screen system can display entries that start with that letter.

As another example, a glyph can be construed as a command to display a certain portion of a map. By way of example, a user who is viewing a portion of a map may trace a letter onto the screen of their device. In response, the touch screen system can display a section of a map that includes the nearest city that starts with that letter.

A user may also be permitted to assign one or more glyphs to particular commands or objects on a computer system. For example, a user may open a contacts entry for a friend and may select a control for submitting a glyph. The user may then trace any glyph that he or she prefers (e.g., the first letter of the friend's nickname or a simple shape) to have that glyph assigned to the friend's contact record. If the user enters that same glyph later while using the touch screen system, the touch screen system can construe the glyph as a command to display the contact record. Multiple glyphs may also be assigned to the same object so that the user has multiple ways to get to such an object.

A single glyph can also be assigned to multiple objects. In such a situation, upon receipt of the glyph from a user, the touch screen system can construe the glyph as a common to display a pop up control that lists the multiple objects. Alternatively, the proper object may be selected automatically by the system based on the context in which the glyph was entered. For example, if the glyph is entered when an address book application is active, the touch screen system can construe the glyph as a command to jump to a contact entry corresponding to the glyph rather than a music playlist corresponding to the glyph. Where the context could refer to multiple objects (e.g., if the glyph is entered on a desktop), the objects may be prioritized according to the object that is most likely to be selected (e.g., because it is frequently accessed by the user of the device, or because it is a type of object that is generally accessed more than another type of object).

Figure 10:
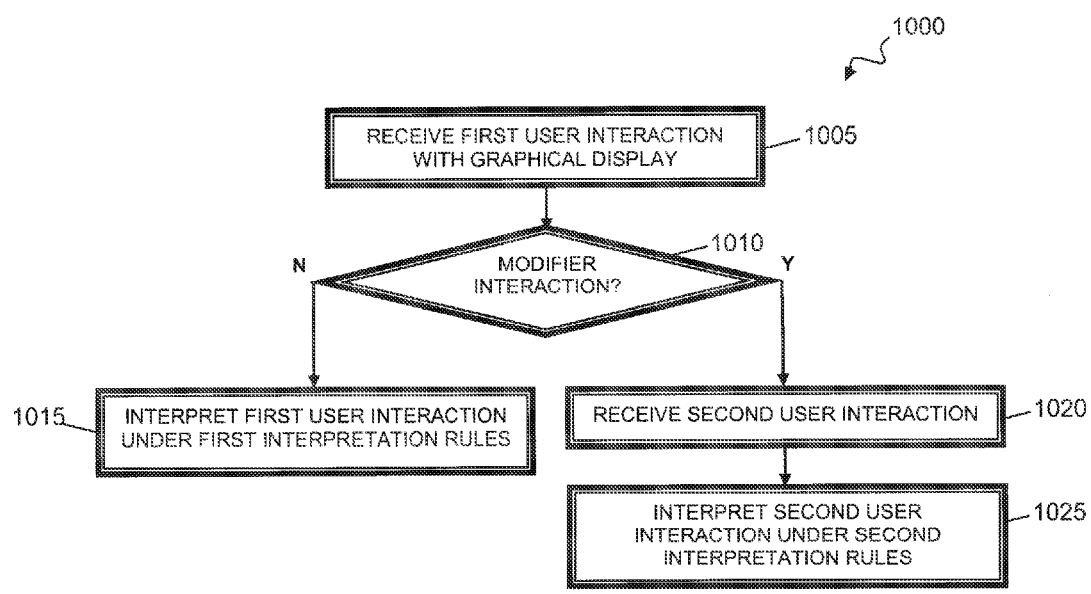
FIGS. 10-12 are flow charts of processes that can be performed by touch screen systems to translate user interaction into input commands

FIG. 10 is a flow chart of a process 1000 that can be performed by a touch screen system to translate user interaction into input commands. Process 1000 can be performed by one or more digital data processing devices that perform operations by executing one or more sets of machine-readable instructions. For example, process 1000 can be performed by command interpreter 145 in touch screen system 100 (FIG. 1). Process 1000 can be performed in isolation or in conjunction with other digital data processing operations.

The system performing process 1000 can receive a first user interaction with the graphical display of a touch screen system at box 1005. The system then determines whether the first user interaction is a modifier interaction at decision 1010. A modifier interaction is user interaction with the touch screen graphical display that modifies the interpretation of other interaction with the graphical display, e.g., when the first and the second interaction occur at the same time. In the context of FIGS. 2-8, the positioning of thumb 805 on the lateral side of graphical displays 200, 500 is a modifier interaction in that it modifies the interpretation of the dragging of finger 305 across displays 200, 500.

A modifier interaction can be identified based on the characteristics of the user interaction with the graphical display. For example, in the context of FIGS. 2-8, the positioning of thumb 805 on the lateral side of graphical displays 200, 500 can be identified according to the positioning of thumb 805 relative to—or even in contact with—the lateral side of the graphical displays 200, 500. A lack of movement of thumb 805 can also be used to identify a modifier interaction. Further, as described further below, the magnitude of the time delay between the positioning of thumb 805 and the dragging of finger 305 can be used to identify a modifier interaction.

In response to determining that the first user interaction is not a modifier interaction, the system performing process 1000 interprets the first user interaction under a first set of interpretation rules at box 1015. The first set of interpretation rules can be a default set of rules, in much the same way that the letters on a keyboard are interpreted, by default, and lower case letters unless the shift key is pressed.

In response to determining that the first user interaction is indeed a modifier interaction, the system performing process 1000 receives second user interaction at box 1020 and interprets that second user interaction under a second set of interpretation rules at box 1025. In some implementations, the second set of interpretation rules can disable scrolling or panning commands. For example, in the context of FIGS. 2-8, the second set of interpretation rules can allow second user interaction with graphical displays 200, 500 to be interpreted as glyphs notwithstanding the display of a subset of a collection of information or a map at the time that the second user interaction occurs. In some implementations, the second set of interpretation rules can be a glyph rule set, as described further below.

Figure 11:
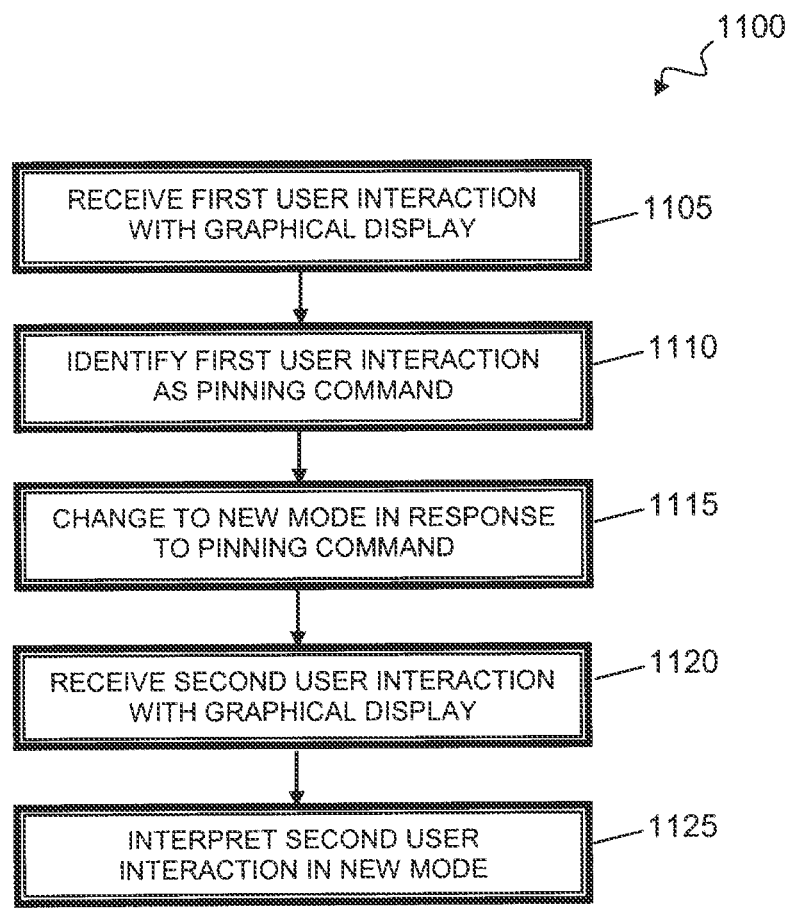

FIG. 11 is a flow chart of a process 1100 that can be performed by a touch screen system to translate user interaction into input commands. Process 1100 can be performed by one or more digital data processing devices that perform operations by executing one or more sets of machine-readable instructions. For example, process 1100 can be performed by command interpreter 145 in touch screen system 100 (FIG. 1). Process 1100 can be performed in isolation or in conjunction with other digital data processing operations.

The system performing process 1100 can receive a first user interaction with the graphical display of a touch screen system at box 1105. The system then identifies that the first user interaction is a pinning command at box 1110. A pinning command is a command that disables a touch screen system from interpreting finger dragging as a scroll or a pan command even if a subset of a collection of information or a map is displayed. For example, in the context of FIGS. 2-8, the positioning of thumb 805 on the lateral side of graphical displays 200, 500 is a pinning command in that touch screen systems do not interpret dragging of finger 305 as a scrolling or panning commands. In some implementations, the magnitude of the time delay between a pair of interactions can be used to identify a pinning command, as described further below.

The system performing process 1100 can change to a new translation mode in response to the pinning command at box 1115. Translation modes are states of a touch screen system that specify the interpretation of user interaction with the graphical display. For example, a touch screen system can interpret a user interaction as a first command while in a first mode but interpret the same user interaction as a second command while in a second mode. In other words, the translation of user interaction depends on the mode of the touch screen system. In some implementations, the different modes can be associated with different sets of rules for translating user interaction.

In some implementations, the new translation mode is a mode that is tailored to interpret user interaction as glyphs. For example, the new translation mode can interpret user interaction involving multiple finger drags in different directions across a graphical display. The new translation mode may also be able to interpret user interaction in which the user temporarily removes a finger from the graphical display in order to complete a glyph. For example, the new translation mode may allow a user to remove a finger during the input of a T-shaped glyph.

In some implementations, the mode change is persistent even in the absence of continued user interaction. For example, in the context of FIGS. 2-8, once the touch screen system changes mode in response to the positioning of thumb 805 on the lateral side of graphical displays 200, 500, the user can remove thumb 805 from graphical displays 200, 500 but graphical displays 200, 500 will remain pinned. In other implementations, the touch screen system is in a quasimode in that the user interaction must continue for the mode change to persist. For example, in the context of FIGS. 2-8, thumb 805 must remain positioned on the lateral side of graphical displays 200, 500 for graphical displays 200, 500 to remain pinned.

The system performing process 1100 can receive a second user interaction with the graphical display of a touch screen system at box 1120 and interpret the second user interaction in the new mode at 1125. The interpretation of the second user interaction in the new mode will generally differ from the interpretation of the second user interaction in the previous mode. For example, in the context of FIGS. 2-8, the interpretation of the dragging of finger 305 as glyphs (i.e., in the new mode) differs from the interpretation of the dragging of finger 305 as a scrolling or panning command. In some implementations, the interpretation of the second user interaction in the new mode can be done in accordance with a second set of rules.

Figure 12:
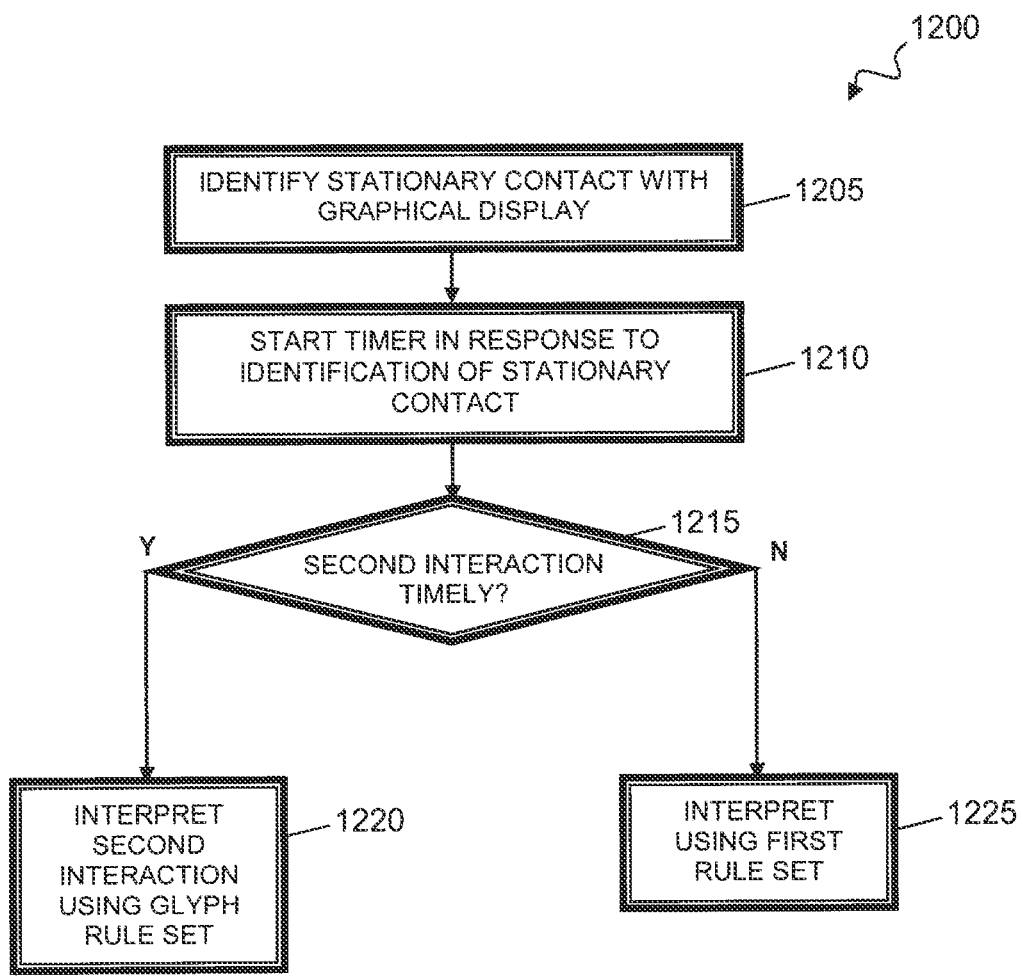

FIG. 12 is a flow chart of a process 1200 that can be performed by a touch screen system to translate user interaction into input commands. Process 1200 can be performed by one or more digital data processing devices that perform operations by executing one or more sets of machine-readable instructions. For example, process 1200 can be performed by command interpreter 145 in touch screen system 100 (FIG. 1). Process 1200 can be performed in isolation or in conjunction with other digital data processing operations. For example, process 1200 can be performed at decision box 1010 in process 1000 (FIG. 10) or at box 1110 in process 1100 (FIG. 11).

The system performing process 1200 can identify stationary contact between a user's appendage and the graphical display of a touch screen system at box 1205. For example, the system can identify that a user's thumb is stationary on the side of a graphical display. In general, the system will not require that the contact be completely motionless. Rather, the system will generally allow a limited range of motion to occur but yet consider the contact stationary.

In response to the identification of the stationary contact, the system performing process 1200 can start a timer at box 1210. The timer thus measures how long the stationary contact has occurred. The timer can be implemented using a clock signal provided by an internal or an external clock such as, e.g., clock 155 of touch screen system 100 (FIG. 1).

The system performing process 1200 can also determine whether a second user interaction with the graphical display of a touch screen system has been timely received at decision box 1215. The timely receipt of the second interaction requires that the second interaction be received before a period measured by the timer has passed. For example, in some implementations, the second interaction must be received within one second, or within 600 ms, in order to be considered timely. In some implementations, the duration of the period is fixed. In other implementations, the duration of the period changes, e.g., in response to the amount of motion in the stationary contact. For example, if the stationary contact is relatively unstable with a large amount of motion, the duration of the period can be increased. On the other hand, if the stationary contact is relatively stable with a small amount of motion, the duration of the period can be decreased.

In response to determining that the second interaction was indeed timely received, the system performing process 1200 interprets the second user interaction in accordance with a glyph rule set at box 1220. A glyph rule set is a set of rules for translating user interaction with the graphical display of a touch screen system as glyph commands. The rules can be tailored to the identification of relatively complex alphanumeric characters and, as the case may be, custom glyphs.

In response to determining that the second interaction was not timely received, the system performing process 1200 interprets the stationary contact, and any second user interaction, using a first rule set at box 1225. The first rule set can translate the stationary contact, e.g., into a command directing that the graphic display zoom into the contacted portion of the map or into a command directing that that further details regarding a contacted entry be provided. If second—but untimely—user interaction was received, the second user interaction can also be interpreted using the first rule set.

Figure 13:
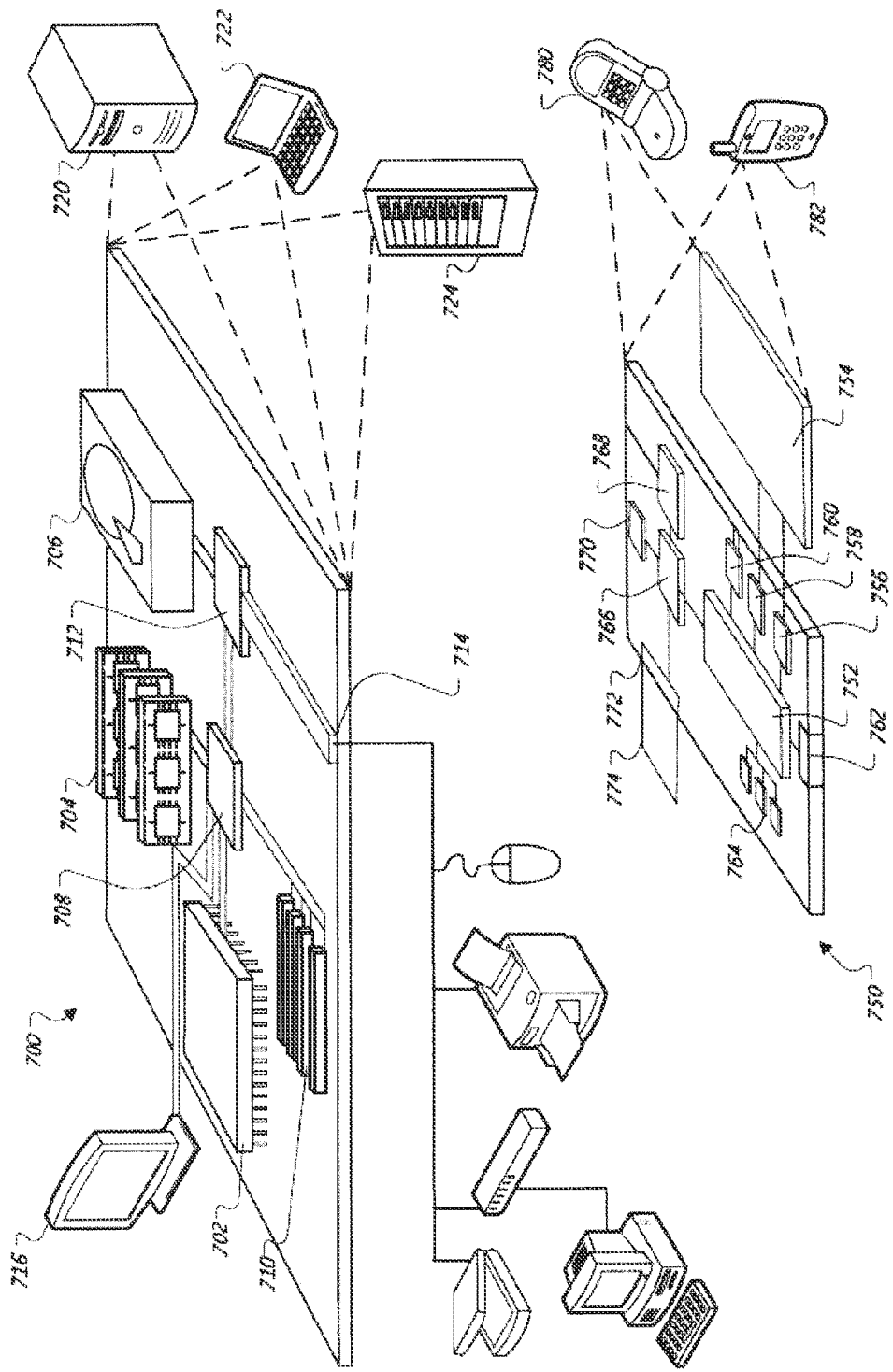
FIG. 13 shows an example of generic devices that may be used with the described techniques.

FIG. 13 shows an example of a generic computer device 700 and a generic mobile computer device 750, which may be used with the techniques described here. In particular, one or both of generic computer device 700 and generic mobile computer device 750 may be a touch screen system and include a touch screen graphical display. Computing device 700 is intended to represent various forms of digital computers, such as laptops, desktops, workstations, personal digital assistants, servers, blade servers; mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 750 and used to update the display of the respective devices 750 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    identifying, with a touch screen system of a computing device, a first input entered over a selectable object displayed on a touch screen graphical display of the touch screen system;
    determining, with the touch screen system, whether the first input entered over the selectable object matches a predetermined type of input associated with selection of the selectable object; and
    in response to determining that the first input entered over the selectable object does not match a predetermined type of input associated with selection of the selectable object, switching, by the computing device, into a glyph input mode that does not involve interaction by the first input with the selectable object, and by which a user of the computing device is enabled by the computing device to provide input by tracing glyphs on the touch screen graphical display.

2. The method of claim 1, further comprising:
    after switching the computing device into the glyph input mode, identifying with the touch screen system, a second input on the touch screen graphical display; and
    interpreting, with the computing device, the second input as a glyph input.

3. The method of claim 1, wherein the first input comprises contact with the touch screen graphical display at a first location on the touch screen display that overlaps in time with contact at a second location on the touch screen graphical display.

4. The method of claim 2, wherein interpreting the second input as a glyph input comprises interpreting the second input under a set of rules tailored to the identification of alphanumeric characters.

5. The method of claim 1, wherein the selectable object comprises a user-selectable icon on the touch screen graphical display.

6. The method of claim 2, wherein interpreting the second input as a glyph input comprises disabling of finger dragging interactions as scrolling or panning commands.

7. The method of claim 1, further comprising the touch screen system pinning the touch screen graphical display in response to determining that the first input over the selectable object does not match a predetermined type of input associated with selection of the selectable object.

8. The method of claim 7, wherein pinning the touch screen graphical display comprises maintaining all images presented on the graphical display completely immobile.

9. The method of claim 1, further comprising the touch screen system changing to a new translation mode in response to determining that the first input over the selectable object does not match a predetermined type of input associated with selection of the selectable object.

10. The method of claim 9, wherein the new translation mode comprises a glyph translation mode tailored to interpret user interaction involving multiple finger drags across the touch screen graphical display as glyphs.

11. A touch screen system comprising:
a touch screen graphical display;
a command interpreter configured to identify modifier interactions with the graphical display and, in response to identification of the modifier interaction, modify the interpretation of other interaction with the graphical display; and
one or more persistent data storage devices, the data storage devices storing a first set of rules for interpreting user interaction with the graphical display and a second set of rules for interpreting user interaction with the graphical display, the first set of rules interpreting motion across a map or a proper subset of a collection of information as a scrolling or panning command, the second set of rules interpreting the motion as a glyph, wherein the command interpreter is configured to modify the interpretation of the other interaction by switching between interpretation under the first set of rules and interpretation under the second set of rules in response to determining that a first input over a selectable object on the touch screen graphical display does not match a type of input associated with selection of the selectable object.

12. The touch screen system of claim 11, further comprising a collection of map information stored at the one or more persistent data storage devices.

13. The touch screen system of claim 11, further comprising a hand-held housing mounting the touch screen graphical display.

14. The touch screen system of claim 11, wherein the command interpreter is further configured to identify contact on a lateral side of the touch screen graphical display as modifier interactions.

15. The touch screen system of claim 11, wherein the command interpreter is further configured to identify stationary contact followed by a timely second contact as modifier interactions.

16. The touch screen system of claim 11, wherein the second set of rules comprises rules for interpreting the motion as a custom glyph.

17. The touch screen system of claim 11, wherein the command interpreter is further configured to identify a pinning command, the pinning command disabling the touch screen system from interpreting a finger dragging input on the touch screen graphical display as a scroll command or as a pan command.

18. The touch screen system of claim 11, wherein:
the touch screen system further comprises a clock; and
the command interpreter is configured to start a timer that relies on the clock in response to identification of a stationary contact with the graphical display.

19. The touch screen system of claim 18, wherein the command interpreter is configured to identify a modifier interaction in response to a second user interaction being received before the timer reaches a threshold period.

20. The touch screen system of claim 18, wherein the threshold period is within 15% of one second.

21. The touch screen system of claim 18, wherein the command interpreter is configured to interpret the stationary contact as a zoom-in command in response to a failure to receive a second user interaction before the timer reaches a threshold period.

22. The touch screen system of claim 18, wherein the command interpreter is configured to interpret the stationary contact as a command directing that that further details regarding an entry contacted by the stationary contact in response to a failure to receive a second user interaction before the timer reaches a threshold period.

23. A touch screen system comprising:
a touch screen graphical display;
means for translating user interaction with a selectable object on the touch screen graphical display into commands that determine which of two different input modes are used, based on a determination of whether the user interaction matches a type of input associated with selection of the selectable object; and
one or more persistent data storage devices storing rules accessible by the means for translating, wherein the rules comprise a first set of rules for interpreting user interaction with the graphical display that is used when the touch screen system is in a first input mode and a second set of rules for interpreting user interaction with the graphical display that is used when the touch screen system is in a second input mode, wherein the second set of rules interprets inputs on the touch screen graphical display as glyph inputs, and wherein the second mode is used in response to determining that an input over the selectable object does not match a type of input associated with selection of the selectable object.

24. The touch screen system of claim 23, wherein the means for translating comprises:
a clock; and
a timer that relies on the clock and configured to start in response to identification of a stationary contact with the touch screen graphical display.

* * * * *

UNITED STATES PATENT AND TRADEMARK OFFICE
CERTIFICATE OF CORRECTION

PATENT NO. : 8,432,367 B2
APPLICATION NO. : 12/621759
DATED : April 30, 2013
INVENTOR(S) : Yang Li et al.

Page 1 of 1

It is certified that error appears in the above-identified patent and that said Letters Patent is hereby corrected as shown below:

On the title page, item [56]:

In the List of References:

Column 1 (Other Publications), line 6, delete "Leam—" and insert -- Learn— --, therefor.

Column 2 (Other Publications), line 15, delete "Internation" and insert -- International --, therefor.

In the Specification:

Column 10, line 45, delete "that that" and insert -- that --, therefor.

In the Claims:

Column 16, line 32, in Claim 22, delete "that that" and insert -- that --, therefor.

Column 16, line 33, in Claim 22, after "contact" insert -- be provided --.

Signed and Sealed this
Fifth Day of November, 2013

Teresa Stanek Rea
*Deputy Director of the United States Patent and Trademark Office*